United States Patent [19]

Mercuri et al.

[11] Patent Number: 5,149,518
[45] Date of Patent: Sep. 22, 1992

[54] ULTRA-THIN PURE FLEXIBLE GRAPHITE CALENDERED SHEET AND METHOD OF MANUFACTURE

[75] Inventors: Robert A. Mercuri, Seven Hills; George Getz, Parma Heights; Ronald A. Greinke, Medina; Ronald A. Howard, Brook Park, all of Ohio

[73] Assignee: Ucar Carbon Technology Corporation, Danbury, Conn.

[21] Appl. No.: 574,807

[22] Filed: Aug. 30, 1990

Related U.S. Application Data

[63] Continuation-in-part of Ser. No. 373,924, Jun. 30, 1989, abandoned.

[51] Int. Cl.⁵ .............................................. C01B 31/04
[52] U.S. Cl. ..................................... 423/449; 423/448; 423/460; 252/502; 264/175
[58] Field of Search ............ 423/448, 449, 460; 252/502; 264/175

[56] References Cited

U.S. PATENT DOCUMENTS

| | | | |
|---|---|---|---|
| 1,191,383 | 7/1916 | Aylsworth | 423/460 |
| 3,404,061 | 10/1968 | Shane et al. | 161/125 |
| 3,431,970 | 3/1969 | Olstowski et al. | 423/448 |
| 3,560,155 | 2/1971 | Olstowski et al. | 423/448 |
| 3,719,608 | 3/1973 | Olstowski | 423/448 |
| 3,885,007 | 5/1975 | Olsen et al. | 423/460 |
| 4,075,114 | 2/1978 | Ishikawa et al. | 423/448 |
| 4,146,401 | 3/1979 | Yamada et al. | 423/460 |
| 4,216,266 | 8/1980 | Hirschvogel et al. | 423/460 |
| 4,244,934 | 1/1981 | Kondo et al. | 423/448 |
| 4,565,649 | 1/1986 | Vogel | 423/460 |
| 4,604,276 | 8/1986 | Oblas et al. | 423/449 |
| 4,895,713 | 1/1990 | Greinke et al. | 423/460 |
| 4,961,988 | 10/1990 | Zhu | 423/460 |
| 5,017,358 | 5/1991 | Yamada et al. | 423/460 |

FOREIGN PATENT DOCUMENTS

| | | | |
|---|---|---|---|
| 58-74515 | 5/1983 | Japan | 423/448 |
| 59-207826 | 11/1984 | Japan | 423/448 |
| 61-138865 | 6/1986 | Japan | 423/446 |
| 1226931 | 3/1971 | United Kingdom | 423/448 |
| 2077246 | 12/1981 | United Kingdom | 423/448 |
| 2128971 | 5/1984 | United Kingdom | 423/448 |

*Primary Examiner*—Robert Kunemund
*Attorney, Agent, or Firm*—Frederick J. McCarthy

[57] ABSTRACT

A process for forming pinhole free ultra-thin flexible sheet material from natural graphite comprising treating low ash natural graphite particles with an oxidizing agent to intercalate the graphite, introducing the particles after they are dried to less than 2% by weight water into a furnace preheated to at least 2000° F. to cause rapid expansion to a specific volume of at least 800 cc/gm and compressing the expanded graphite to below 8 mils in thickness with a density of less than 1.3 g/cc.

5 Claims, No Drawings ize calendered sheet of thickness less than ten (10) mils.

ULTRA-THIN PURE FLEXIBLE GRAPHITE CALENDERED SHEET AND METHOD OF MANUFACTURE

FIELD OF THE INVENTION

This application is a continuation in part of U.S. patent application Ser. No. 373,924 filed Jun. 30, 1989 now abandoned, and relates to a process for forming ultra-thin flexible sheet material from natural graphite.

BACKGROUND OF THE INVENTION

Graphites are made up of layer planes of hexagonal arrays of networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size; the crystallites being highly aligned or oriented with respect to each other and possess well ordered carbon layers. In other words, highly ordered graphites have a high degree of preferred crystallite orientation. It should be noted that such graphites possess anisotropic structures and thus exhibit or possess many properties which are highly directional. Briefly, natural graphites may be characterized as laminated structures of carbon, that is, structures consisting of superposed layers or laminae of carbon atoms joined together by weak Van der Waals forces.

The conventional process for producing flexible graphite sheet material e.g. web, paper, strip, tape, foil, mat or the like is described in U.S. Pat. No. 3,404,061 and briefly comprises treating the graphite particles with a suitable oxidizing agent to form soggy graphite particles which are heated to permit a natural expansion and then compressed or compacted together, in the absence of any binder, so as to form a flexible integrated graphite sheet of desired thickness and density. The compression or compaction is carried out by passing a thick bed of expanded particles between pressure rolls or a system of multiple pressure rolls to compress the material in several stages into sheet material of desired thickness. The compression operation flattens the expanded graphite particles causing them to engage and interlock. Obviously, any thickness can be realized by applying sufficient compressive force. However, the greater the compressive force the higher the density of the product. The density of the product determines the physical characteristics of the product such as deformability and stiffness. For applications where deformability is mandatory such as gasket seals the product standard density should be no greater than 1.3 g/cc and preferably in the range of 0.7 to 1.2 g/cc. Higher density product is too stiff for use as flexible sheet graphite where low density is necessary so that the product readily deforms and mashes into the irregularities of the surfaces to be sealed. Moreover, if the compressive force applied to the particles is excessive the particles split and separate causing weak spots which puncture to form pinholes when forming very thin sheets. Accordingly, for flexible graphite sheet application, the sheet thickness was heretofore substantially limited to a thickness in excess of about ten (10) mils. One recent proposal for forming thin sheet graphite material with a thickness equal to ten (10) mils is described in Japanese patent publication application No. 61(1986)-138865 entitled Method For Producing Flex Graphite Sheet. According to the Japanese publication a thin graphite sheet can be formed by applying an adhesive layer and expanded graphite on a polyester film, metal foil or paper tape before the graphite sheet is rolled down to the desired thickness of ten mils.

It has been discovered in accordance with the present invention that a sheet of ultra-thin flexible low density graphite of below eight mils in thickness can be formed without pinholes from natural graphite particles by increasing the degree of expansion of the particles during the exfoliation operation to produce particles which, prior to compression, have been expanded to a specific volume of at least 800 cc/gm. When the exfoliated graphite particles are expanded before compression to at least this minimum specific volume the density of the compressed sheet can be kept below 1.3 g/cc without increasing the susceptibility for forming pinholes during compression of the particles. The particles can then be compressed into ultra-thin sheet material of below 8 mils in thickness and preferably between 2–5 mils in thickness with a high degree of area/weight uniformity at a density of less than 1.3 g/cc, preferably between 0.7 to 1.2 g/cc. The process of the present invention is applicable primarily to natural graphite particles.

SUMMARY OF THE INVENTION

A process for producing a pinhole free flexible, low density, graphite sheet of less than 8 mils in thickness comprising the steps of:
(a) providing natural graphite particles having a purity of at least 97% pure natural graphite;
(b) treating the natural graphite particles with an oxidizing agent to intercalate the graphite,
(c) washing the intercalated graphite particles to minimize agglomeration;
(d) drying the washed particles;
(e) introducing the dried particles into a preheated furnace at a preselected temperature of at least about 2000° F. to cause the graphite particles to undergo extremely rapid expansion until the particles expand to a specific volume of at least about 800 cc/gm; and
(f) compressing said voluminously expanded graphite in the absence of a binder to a sheet-like material between 2–8 mils in thickness with a density of less than about 1.3 g/cc.

DESCRIPTION OF THE PREFERRED EMBODIMENT

The process of the present invention is based upon the discovery that an increase in the expansion of pure natural graphite particles in any particle size distribution, typically between 20 to 50 mesh USS(U.S. Standard), to an expanded particle size with a specific volume of at least 800 cc/gm will permit the expanded particles to be compressed into a sheet-like material of below 8 mils in thickness and preferably down to a thickness of between 2–5 mils at a density of less than 1.3 g/cc such that the compressed material remains flexible and pinhole free. Only particles of natural graphite may be selected for carrying out the process with a graphite purity of at least about 97% and preferably a graphite purity of above 99%. The natural graphite particles may be in the form of flakes of laminated graphite mined from natural graphite.

The graphite particles are treated with a suitable oxidizing agent, or mixtures thereof such as sulfuric acid and nitric acid. As is known to the art, various combinations of oxidizing agents and oxidizing mixtures may be employed to effect intercalation of the layered graphite particles. Other oxidizing agents include chromic acid, potassium chlorate, potassium chromate, potassium dichromate, potassium permanganate, perchloric acid and hydrogen peroxide. A wide range of oxidizing agent concentrations is usable. The treatment of graphite particles with oxidizing agents or oxidizing mixtures is carried out for an appropriate time period to fully intercalate the particles.

Upon completion of the oxidizing treatment, the thoroughly wetted or soggy graphite particles are rinsed or washed with an aqueous solution, preferably water, to minimize particle agglomeration and to leach the residual acid. The rinsed or washed particles are then dried by passing the particles through a drier to reduce the moisture content to less than about 2% by weight and preferably to less than 1% by weight water.

The exfoliation of the particles is controlled by introducing the dried particles directly into a furnace which has been preheated to at least about 2000° F. and preferably to a temperature of 2500° F. or higher. The direct injection of the particles into the very hot furnace is critical to the invention. Although any conventional furnace may be used, a furnace employing a flame burner is preferred with the particles being directly injected into the hottest spot of the furnace.

Introduction of the predried particles into the preheated furnace as described above results in exfoliated graphite particles expanding to a specific volume of at least about 800 cc/gm and preferably to 1,000 cc/gm or higher. In accordance with the present invention, unless the graphite particles are exfoliated to a specific volume of at least about 800 cc/gm, the graphite sheet, upon compaction to less than 8 mils thick, will have a density substantially above 1.3 gm/cc. It was totally unexpected that the density of the product can be kept below 1.3 g/cc at a thickness of less than 8 mils by controlling the degree of exfoliation to a specific volume above 800 cc/gm.

The voluminously exfoliated particles are then passed through pressure rolls or a series of multiple pressure rolls adjusted to form a compacted or compressed sheet with a thickness of below 8 mils and preferably between 2-5 mils in thickness. The true diameter of the calendering rolls should be accurately specified preferably to a tolerance no greater than ±0.0005 inches.

The following examples are illustrative of the invention:

EXAMPLE I

Five hundred pounds of minus 30 mesh, 99.5% pure natural graphite flake were treated in a mixture of sulfuric and nitric acids at concentrations to yield the desired intercalation compound. The flake was water washed and dried to approximately 1% by weight water. It was then screened to totally eliminate agglomerations. The flake was introduced into a furnace at 2500° F. to effect extremely rapid and, therefore high expansions. The exfoliated graphite expanded to 1050 cc/gm and was rolled into continuous pinhole free sheet material to the target parameters, 24 inches in width, about 2 ounces/square yard, about 0.002 to 0.003 inch in thickness, and with an area weight uniformity of typically 10% or better. Average density was about 0.9 g/cc.

The best results as determined by area weight uniformity were achieved with a very high (800 to 1200 cc/gram) expansion particularly for gauges thinner than 0.003 inch.

EXAMPLE II

One hundred grams of minus 30 mesh, 99.9% pure natural graphite flake were treated in a mixture of sulfuric and nitric acids at concentrations to yield the desired intercalation compound. The flake was water washed and dried to approximately 1% by weight water and screened to eliminate agglomerations. The flake was introduced into a furnace at 2500° F. to effect extremely rapid and, therefore high expansions. The exfoliated graphite expanded to approximately 1500 cc/gm and was rolled into pinhole free sheet of less than 2 ounces/square yard and averaged 0.002 inch in thickness. Average density was about 0.8 g/cc.

What we claim is:

1. A process for producing a continuous pinhole free sheet of flexible, low density, graphite having a thickness of between 2-5 mils comprising the steps of:
    (a) providing natural graphite particles having a purity of at least 97% pure natural graphite;
    (b) treating the natural graphite particles with an oxidizing agent to intercalate the graphite;
    (c) washing the intercalated graphite particles to minimize agglomeration;
    (d) drying the washed particles;
    (e) introducing the dried particles into a preheated furnace at a preselected temperature of at least about 2000° F. to cause the graphite particles to undergo extremely rapid expansion until the particles expand to a specific volume of at least about 800 cc/gm;
    (f) passing said expanded graphite through pressure rolls to form a compressed sheet of said graphite with a thickness of between about 2-5 mils and a density of less than 1.3 g/cc; and
    (g) rolling said compressed sheet into a continuous pinhole free sheet of less than about 2 ounces/sq. yard.

2. A process as defined in claim 1 wherein said particles are dried to less than 2% by weight water.

3. A process as defined in claim 2 wherein said particles are dried to less than about 1% by weight water.

4. A process as defined in claim 2 wherein the dried particles are introduced into a preheated furnace at a preselected temperature of at least about 2500° F.

5. A process as defined in claim 4 wherein said graphite particles are expanded to at least 1000 cc/gm.

* * * * *